United States Patent
Ambekar et al.

(10) Patent No.: US 11,580,229 B2
(45) Date of Patent: Feb. 14, 2023

(54) COMPUTER-IMPLEMENTED METHOD OF SECURITY-RELATED CONTROL OR CONFIGURATION OF A DIGITAL SYSTEM

(71) Applicant: Continental Teves AG & Co. OHG, Frankfurt am Main (DE)

(72) Inventors: Abhijit Ambekar, Schwalbach a Ts. (DE); Mohammad Ilyas, Schwalbach a Ts. (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 382 days.

(21) Appl. No.: 16/943,989

(22) Filed: Jul. 30, 2020

(65) Prior Publication Data
US 2021/0042422 A1 Feb. 11, 2021

(30) Foreign Application Priority Data
Aug. 6, 2019 (EP) .................................... 19190331

(51) Int. Cl.
| | |
|---|---|
| *G06F 21/57* | (2013.01) |
| *G06N 20/00* | (2019.01) |
| *G06F 21/55* | (2013.01) |
| *G06N 5/04* | (2023.01) |

(52) U.S. Cl.
CPC .......... *G06F 21/577* (2013.01); *G06F 21/554* (2013.01); *G06N 5/04* (2013.01); *G06N 20/00* (2019.01); *G06F 2221/034* (2013.01)

(58) Field of Classification Search
CPC ................. G06F 21/577; G06F 21/554; G06F 2221/034; G06N 20/00; G06N 5/04
See application file for complete search history.

(56) References Cited

U.S. PATENT DOCUMENTS

2018/0219909 A1* 8/2018 Gorodissky ............. H04L 43/50

OTHER PUBLICATIONS

Lorenzo Franceschi-Bicchiera, https://www.vice.com/en_us/article/zmpx4x/hacker-monitor-cars-kill-engine-gps-tracking-apps.
J. Golson, "https://www.theverge.com/2016/8/2/12353186/car-hack-jeep-cherokee-vulnerability-miller-valasek", Aug. 2, 2016.

* cited by examiner

*Primary Examiner* — Hee K Song
(74) *Attorney, Agent, or Firm* — Cozen O'Connor

(57) ABSTRACT

A computer-implemented method includes: receiving system information data representing configurations of digital systems; receiving attack information data associated one or more of the digital systems; analyzing the received system information data and attack information data, to associated attack types; identifying, for each identified attack type, correlations and/or causalities between individual system constituents or combinations thereof in the digital systems associated with attacks; determining and assigning, based on the identified correlations and/or causalities, an attack vulnerability value, for each attack, respectively, to each of the systems and/or systems' constituents and/or combinations thereof; and retrievably storing attack vulnerability values associated with the systems, system constituents and/or combinations thereof.

11 Claims, 3 Drawing Sheets

COMPUTER-IMPLEMENTED METHOD OF SECURITY-RELATED CONTROL OR CONFIGURATION OF A DIGITAL SYSTEM

CROSS-REFERENCE TO RELATED APPLICATION

This application claims the priority of European Application No. EP 19190331 filed Aug. 6, 2019, the content of which is hereby incorporated by reference.

BACKGROUND OF THE INVENTION

1. Field of the Invention

The present invention relates to computer-implemented methods of system control or configuration, in particular to system control or configuration in connection with security-relevant or safety-relevant events or incidents. The present invention further relates to computer-implemented methods of generating information for configuring processor-controlled components implementing the methods of system control, as well as computer program products, computer-readable media comprising instructions representing the methods, and computer systems implementing the methods.

Definitions

In the context of the present disclosure "an attack" may be understood as any actual attempt to exploit a vulnerability of a digital system, aiming at exposing, altering, disabling, destroying, stealing or gaining unauthorized access to or making unauthorized use of an asset, i.e., the digital system. Attacks may be classified into different types, according to their main underlying functioning principle.

In the context of the present disclosure "a threat" may be understood as a classification of attacks in accordance with their effect, object or use. There may be at least six threat classes, including "spoofing", "tampering", "repudiation", "information disclosure", "denial of service", and "elevation of privilege".

Spoofing is generally related to causing an attacked system to accept false information and operate based on that false information. The false information may include false location data, false authentication data and the like.

Tampering generally relates to unauthorized modifications of hardware, software and/or data that affect the integrity of a device or system.

Repudiation generally relates to attempts to cast doubts on the integrity and origin of data or information, and is more frequently used in the context of "non-repudiation", which refers to a situation where a statement's author cannot successfully dispute authorship or the integrity of the statement.

Information disclosure generally relates to providing information to a party that is not authorized to see it. This may include breaches in privacy mechanisms both in terms of personal data of a natural person or of data used within a device or exchanged between devices that is used for the operation of the device(s).

Denial of service, or DoS, generally relates to overusing of system resources to the effect that a system can no longer provide one or more of the other services it is normally providing. A DoS attack can be exploited by a malevolent actor who tries to overstress a computer-controlled system, for causing it to ultimately skip or halt functions that may be safety-critical.

Elevation of privilege generally relates to allowing someone or some device to perform or control functions they are not authorized to perform or control under normal conditions. An example for this threat is allowing a normal user to execute code as a system administrator.

Attacks and threats may share common properties, and the terms may be used interchangeably throughout this specification if such use is not obviously precluded through the respective context.

In the context of the present disclosure an event may be defined as any given attack aimed at causing damage either financially or otherwise by exploiting existing security weaknesses or vulnerabilities in a given system.

In the context of the present disclosure an incident can be defined as any given event that can be associated to a given manufacturer of a system or its constituents. An event may or may not be an incident but an incident is always an event.

2. Description of the Related Art

Modern transportation means, like for example cars, trucks or trains, represent digital systems that comprise a plurality of engine control units (ECUs). These ECUs receive input from a plurality of sensors and are communicatively connected through one or more of various types of communication interfaces, through a shared power source, and may be operated under similar environmental conditions. These ECUs cooperate to provide various functions within the transportation means, including safety functions such as anti-lock brakes, airbag control, seat belt tightening, security functions such as access control, environmental functions such as emission control, and the like. Typically, the manufacturer of the transportation means, e.g., the entity that produces the completed transportation means and distributes it under its brand, does not develop and make all of the various ECUs forming a digital system. Rather, the ECUs are often independently developed and provided by different suppliers in accordance with a more or less detailed description of interfaces and functional requirements provided by that manufacturer, which requirements stipulate physical and logical properties of the ECU and its function within the system. Further, identical or similar ECUs may be used in a variety of different digital systems from a plurality of system manufacturers, or system integrators. In addition to one or more communication interfaces for communicating with other ECUs, an ECU may have sensors for sensing various environmental or other conditions that are relevant for the operation of the ECU or the transportation means, or interfaces for connecting such sensors. The environmental conditions may include temperature, humidity, precipitation, but also location and speed of a transportation means, and the like.

ECUs may communicate via external interfaces with external system components or via internal networks with internal system components, for providing functions and services. Such communication may include communication for informing about current or impending operation modes that may be relevant for the operation of other ECUs in the system, for indicating current or impending provision of functions, environmental and other conditions and the like. ECUs may also communicate with each other for providing their respective input for a complex functionality. For example, the part of a navigation system visible to an operator may be implemented in a head unit of a transportation means which provides a user interface, but may require data from other ECUs for functioning, e.g., speed data from an instrument cluster, GPS data from a GPS receiver, etc.

Features or vulnerabilities of ECUs, the communication between different ECUs and/or sensor input to one or more ECUs may be exploited by malevolent actors, e.g., for changing the intended operation of the ECUs, for gaining access to the system or taking control over the system, for causing damage, and for many other reasons.

For example, attacks on transportation means have been reported, in which a hacker wirelessly connected to an ECU of a car and activated the braking system, forcing the vehicle to stop. (Source: https://www.theguardian.com/technology/2015/aug/12/hack-car-brakes-sms-text)

In other attacks that have been reported hackers gained access to interior of the vehicle by intercepting remote control codes and replaying the codes at a later time.

Yet further attacks have been reported, in which hackers cut off the engine of cars (Source: https://www.vice.com/en_us/article/zmpx4x/hacker-monitor-cars-kill-engine-gps-tracking-apps) or took control over the electronic steering system (Source: https://www.theverge.com/2016/8/2/12353186/car-hack-jeep-cherokee-vulnerability-miller-valasek).

While many of the past attacks were meant to raise public awareness for security issues, criminal hacking, e.g., for fraudulent use of car-sharing services has also been reported.

In some of the attacks a malevolent actor may monitor communication between system components to gain insight about authentication or authorization procedures and passwords and use this insight for injecting messages targeted to gain access to the system. In other attacks a malevolent actor may identify a sensor that transmits updated sensor data to an ECU as soon as a measured value has changed, causing the ECU to process the updated sensor data with high priority. If the malevolent actor manages to cause the sensor to transmit updated sensor data at a high rate this may cause the ECU to use all available computing resources and ultimately crash, or restart. If the updated sensor data is sent over a network this may even have a negative impact on the operation of other ECUs in the system, e.g., by blocking limited network resources required for the operation of the system. Such attacks fall into the category of denial-of-service attacks, or DoS attacks, and are often used in certain system operating states, e.g., during start-up, because individual ECUs and even more so systems comprising several networked ECUs may be more vulnerable for attacks during a start-up phase, during which multiple security processes within an individual ECU or between several ECUs that could identify such attack and react accordingly may not yet be fully running and/or synchronized.

These and other attacks show that there is a need for identifying vulnerabilities in individual ECUs and other system components and in systems consisting of a plurality of ECUs and/or other system components, ultimately serving for developing, deploying and enacting preventive measures and/or measures for reducing the vulnerability to or the damage caused by attacks, ideally before an attack actually occurs. Further, the ever-increasing diversity in digital systems resulting from combining more or less standardized components or modules in accordance with the desires and requirements of individual users, a phenomenon that is also referred to as mass customization, may bring about a confusing, unmanageable plurality of similar yet different systems. Each of these systems may suffer from various vulnerabilities to attacks or threats, simply because it has become impossible to know all ways and manners system constituents can interact and interfere, and possibly open new, formerly unknown vulnerabilities. Obviously, it may be impossible to remove all vulnerabilities of ECUs or systems, notably at economically reasonable costs, and there is, thus, also the need for securing evidence after a vulnerability has been exploited in an attack, for later use in court trials or insurance claims. These court trials may not necessarily be directed against an attacker, but may also be directed against a manufacturer of an ECU or of a system comprising several ECUs, trying to show negligence in respect of securing the system against attacks.

Presently there is no method or system that comprehensively or even only partially serves these new needs.

SUMMARY OF THE INVENTION

In accordance with a first aspect of the present invention there is provided a computer-implemented method of identifying and classifying a plurality of digital systems' and/or their components' or constituents' vulnerabilities to one or more of a plurality of threat classes and/or attack types.

In accordance with a second aspect of the present invention there is provided a database that retrievably stores information about digital systems and/or their components and their classification in respect of their vulnerability to a plurality of threat classes and/or attack types, and to use the classification information for ranking the digital systems or components thereof into corresponding risk classes.

In accordance with a third aspect of the present invention there is provided a method of configuring digital systems to exhibit immunity or a reduced vulnerability against one or more attack types, based on classifications of the system's constituents and/or similar systems in respect of their vulnerability to threat classes and/or attack types.

In accordance with a fourth aspect of the present invention there is provided a method of monitoring a digital system for identifying a present or impending attack thereon, and for controlling the digital system in response to an identified attack.

In accordance with a fifth aspect of the present invention there is provided a security component or monitoring entity for a digital system, the security component or monitoring entity implementing the method of monitoring and controlling the digital system it is associated to in accordance with the fourth aspect.

In the context of the present description classifying may represent a procedure by which a membership in or an affiliation of an element with one or more of a number of different sets or classes is determined or predicted. A classifier may represent a function determining a relation between input data and a classification result, which function may be configured by one or more configuration parameters, including thresholds, factors, weights, and the like. A classifier may also represent configuration parameters for configuring a machine learning or artificial intelligence entity tasked with classifying.

A digital system in this context comprises at least one engine control unit, or ECU, which is at least identifiable by a part number or other unambiguous identifier, and which may further be distinguished by one or more of a hardware and/or software version and/or revision number, manufacturer identifier and place or site of origin or the like. The ECU of the system may have one or more microprocessors, one or more interfaces for receiving and/or transmitting communication and/or sensor data, and a power supply. The interfaces for transmitting and/or receiving communication and/or sensor data may be coupled to corresponding transport media, wired or wireless.

First Aspect

A computer-implemented method of identifying and classifying a plurality of digital systems' and/or their components' vulnerabilities to one or more of a plurality of threat classes and/or attack types in accordance with the first aspect includes receiving system information data representing configurations of a plurality of digital systems.

In this context a configuration may include information describing or identifying the system's constituents, e.g., one or more ECUs that are present in a respective system, irrespective of whether or not the system had been exposed to an attack or is subject to a threat, and their relation to each other and to their surroundings, e.g., whether and how they communicate with each other or with the environment. The system information data may include, inter alia, information about properties, capabilities and functions provided by the system or its constituents, e.g., information about processor or memory types used in ECUs and other system constituents, information about software versions and revisions executed by processors in ECUs and other constituents of the system, information about hardware versions and revisions, information about sensors and types of communication connections provided and used in the system, information about a supplier who manufactured a system constituent, and the like. The system information data may even include information about types and manufacturers of wires, cables or connectors used in the system, as these may exhibit different properties in the context of an attack. If only information identifying the system or the system's constituents is received, the identification permits obtaining the information about the functions and capabilities accordingly from other sources, e.g., system manufacturer's or system integrator's databases or other information sources providing system information.

The computer-implemented method in accordance with the first aspect further includes receiving attack and/or threat information data associated with attacks on and/or threats posed to individual ones of the plurality of digital systems.

Receiving in the context of the present disclosure may include controlling a digital communication interface to establish, maintain and terminate a data communication connection via which digital signals carrying the system information data or attack and/or threat information data is received. Attack or threat information data may be received from a plurality of sources, including event or incident reports provided by users, maintenance or service personnel, further including forensic analysis data and reports, e.g., from security components of digital systems that had been targeted by an attack, reports from penetration tests performed on systems through authorised persons or entities, also referred to as PEN tests, reports from security conferences, and the like. Receiving may comprise automatic extraction of such data from digital and non-digital sources, including extracting and semantically analyzing text after accordingly processing non-digital sources.

The attack or threat information data may include a description of the type of attack or threat, if available, but may also include results, effects or behaviors observed in the respective digital system or its constituents in connection with an assumed or actual attack thereon, as well as other information that may be more or less related to the attack, including data representing active communication at the time of attack with components external to the system and between system components, availability of external cell phone or Wi-Fi network connections, system sensor data sampled at the time of the attack, and even such mundane information as the location of the attack, the date and time of day, temperature, or the like. Such information may also be referred to as contextual information, and parts thereof may be obtained from secondary sources based on information received from primary sources, e.g., a weather report may be obtained from a weather service based on a location, date and time of day information received from a primary source. Generally, the received attack and/or threat information data includes at least information that allows for identifying an associated system as well as information allowing for identifying the type of attack and/or class of threat, thus allowing for mapping a threat or an attack to one or more of the other digital systems for which system information data had previously been received. Such identification data may be a simple reference to a system, which may be pointing to a system configuration received in the previous step, or may include a more comprehensive description of the system and its configuration.

The method further includes analyzing the system information data and the associated attack and/or threat information data, for identifying one or more attack types and/or threat classes associated with individual ones of the digital systems for which attack and/or threat information data has been received. As defined further above, an attack type or threat class may represent a high-level description or cluster of types of attacks, e.g., man-in-the-middle-attack, brute-force-attack, etc., and classes of threats, e.g., spoofing, tampering, repudiation, information disclosure, denial of service and elevation of privilege, respectively. This step may produce an association of individual systems to one or more attack types and/or threat classes. Any threat type or attack class may be linked with one or more systems, and any system may be associated with one or more threat types and/or attack classes.

The method further includes identifying correlations and/or causalities, for each of the identified attack types and/or threat classes, between individual system constituents or combinations of system constituents in the digital systems associated with the respective attacks and/or threats. Identifying correlations and/or causalities may include, for each attack or threat, correlating all information available on systems reported to have been subject to that attack or threat, including contextual information, where available. This may serve for identifying system constituents or combinations thereof which are invariably present in systems that were subject to certain attack types or threat classes, or may identify certain communication sequences preceding an attack, or the like. This step also forms one basis for identifying systems, system constituents or combinations thereof, for which no attacks or threats have yet been reported, but which may nonetheless be vulnerable to such attacks or threats, either generally or under certain contextual circumstances.

The computer-implemented method further includes determining and assigning, based on the identified correlations and/or causalities, an attack and/or threat vulnerability value, for each attack or threat, respectively, to each of the systems and/or systems' constituents and/or combinations thereof. The result of the assignment may produce a collection of data, e.g., for a database, that includes information about specific systems, individual constituents and combinations thereof, which are more often subject to attacks or threats than other systems, individual constituents and combinations thereof. The data collection produced in this step may allow for identifying existing or planned systems, systems' constituents, or combinations thereof that are more vulnerable to attacks or threats than others, even if no threat or attack has yet been reported for them, ultimately enabling proactive measures for removing or reducing the vulnerability. Determining the attack and/or threat vulnerability value of a system may comprise combining the individual vulnerability values for system constituents or combinations thereof already found in the database. Combining may be weighted in case individual systems or system constituents are assigned different attack and/or threat vulnerability values in different system configurations.

For example, a system constituent may have a higher weight in the combination for the threat vulnerability, if it is more "attractive" as a target. Attractiveness may be higher for components that are produced and deployed in higher numbers, because there are more targets to attack, which may be more lucrative for attackers than "rare" targets, i.e., components that are produced in smaller numbers. On the other hand, a "rare" target may be attractive for an attacker when it is used in a system that is preferred by specific users.

The computer-implemented method further includes retrievably storing attack and/or threat vulnerability values associated with the systems and/or systems' constituents and/or combinations thereof, e.g., in a database.

The method in accordance with the first aspect may provide a fine-grained assessment and classification down to levels of revisions of hardware or software, and even for individual suppliers and their manufacturing sites. The vulnerability values determined in accordance with the method may be different for system constituents that otherwise appear identical in their look and their function even to an informed observer, only due to one small detail that is different. This information may be used advantageously for identifying various options of hardening digital systems against attacks, and may facilitate choosing the option that is most suitable for individual systems and their requirements, as will be discussed further below.

The method in accordance with the first aspect may further allow identifying incidents occurring with all or specific systems of a particular manufacturer, as a basis for taking corresponding action.

Second Aspect

In accordance with the second aspect of the present disclosure it is desirable to provide a database that retrievably stores information about digital systems and/or their components and their classification in respect of their vulnerability to a plurality of threats and/or attacks as output by the method according to the first aspect. The database in accordance with the second aspect, which may be of conventional design, may provide input to processes that rank the digital systems or components thereof into corresponding risk classes, and/or for simulation processes that determine vulnerabilities of digital systems. Determining vulnerabilities may advantageously be used during a design phase or when modifying systems, targeting a system vulnerability to one or more attacks and/or threats that lies below a predetermined value.

The classifications in respect of their vulnerability to a plurality of threats and/or attacks, i.e., the risk class, determined for a system or system constituent that can be retrieved from the database may be used for configuring the system to only operate in specific limited operating modes, limited operation locations, and the like, in dependence of the risk class, and/or for determining ancillary factors or conditions pertaining to the operation of the system, e.g., requirement of additional supervision, reduced service or maintenance intervals, limited continuous use time, insurance requirements, etc. Such limiting may be implemented by accordingly providing operation or configuration parameters to the system.

Third Aspect

A computer-implemented method, in accordance with the third aspect of the present disclosure, of configuring a digital system, targeted to provide immunity or a reduced vulnerability of the digital system against one or more attacks and/or threats, based on the system's present classification in respect of the vulnerability to those threats and/or attacks, comprises receiving system information data representing a configuration of a digital system to be configured, or receiving information allowing for identifying a digital system to be configured in a database, e.g., the database according to the second aspect, for receiving information representing the system configuration from that database.

As discussed in connection with the method according to the first aspect, information describing the system may include information describing or identifying system constituents, as well as their interconnection with each other. The information describing or identifying the system constituents may also include information about hardware and/or software versions and revisions, if applicable. It is, thus, possible to configure existing systems as well as systems that are in a design phase using the present method. If a system to be configured in accordance with the present method is not found in the database, a sufficiently similar system may be found in the database, as will be discussed further below.

In this context configuring a digital system may include applying modifications to existing systems, or selecting, in the design phase of a digital system, system constituents exhibiting the desired or required properties.

Applying modifications may include selectively changing software executed in some of the system constituents of a digital system while not changing the software in other constituents of that system. Changing software may include updating to a later version or reverting to a previous version. Applying modifications may also include selectively changing configuration parameters of a system constituent without otherwise changing the computer instructions of the software executed by the system constituent. Changing configuration parameters may thus also include changing configuration parameters of a machine learning or artificial intelligence entity provided in a digital system, which entity may be provided, e.g., for monitoring communication and sensor signals of the system for identifying a present or impending attack and for taking appropriate responsive actions. Changed configuration parameters may, e.g., instruct the monitoring entity to use additional data or signal sources, may provide changed weights or reference pattern for information obtained from the various data or signal sources monitored for identifying an impending or ongoing attack or threat, and the like. Applying modifications may further also include selectively replacing one or more system constituents while keeping other system constituents. Other types of modifications within the scope of the present disclosure will be apparent to the person skilled in the art.

The computer-implemented method of configuring digital systems further includes identifying one or more systems having the same or a sufficiently similar configuration in the database. A system having a sufficiently similar configuration may include an existing system that has the same or similar system constituents in terms of hardware versions or revisions, but runs different software versions or revisions in one or more of the system constituents. It is, however, also possible to create yet non-existing, hypothetical systems by combining suitable system constituents found in the data base, which are sufficiently similar, and predicting their respective vulnerability to threats and/or attacks. Any sufficiently similar system or system constituent must provide at least the same capabilities or functions in order to be considered an alternative system or system constituent. Thus, the method may also comprise identifying, in the database, for one or more of the constituents of the system to be configured, alternative system constituents providing at least the same capabilities or functions as the system to be configured.

The computer-implemented method in accordance with the third aspect further includes identifying and classifying the vulnerabilities of the system to be configured and of the sufficiently similar alternative systems in accordance with the method according to the first aspect. It is to be noted that a classification of the system to be configured prior to identifying alternative systems may be obtained, and that identifying alternative systems and that the method may be terminated when the classification of the system to be configured already indicates a vulnerability below a predefined threshold.

Identifying and classifying the vulnerabilities may comprise retrieving the attack and/or threat vulnerability values associated with the systems and/or systems' constituents for one or more threats and/or attacks from a database generated in accordance with the computer-implemented method of the first aspect. The result is a corresponding number of alternative systems providing at least the same capabilities or functions as the system to be configured and their associated threat and/or attack vulnerability values. If a system identical to the one to be configured is found in the database, the corresponding threat and/or attack vulnerability value may be retrieved from the database without performing the classification again.

The method in accordance with the third aspect further includes ranking the system to be configured and the identified alternative systems in accordance with one or more ranking criteria.

The ranking criteria may include differences of the overall systems or their constituents in terms of power requirement, weight, spatial dimension, cost, but may also include measures for the effort that is required for configuring the system. The latter may be relevant in case an existing system is to be updated for achieving immunity or reduced vulnerability against attacks and/or threats, and may also take present contextual information into consideration. The effort for configuring may depend on various system properties, such as a system's location, connectivity at the time of update or configuration, use schedule, time required for completing the configuration or update, availability of alternatives, e.g., how far away is the next suitable hardware replacement if a software update of the system is considered difficult, and the like, and may also depend on combinations thereof. Another input for the ranking may be a value for the urgency of the update, which may also depend from other protective measures that are in place at the location of the digital system.

For example, an existing system may require a software update of one or more of its constituents, but has a data communication connection with limited bandwidth or reliability. The system must, however, not be inoperative for longer periods of time. Further, replacement for hardware components of the system that have the required software version are available at a nearby maintenance location or dealer. In this case the software update, which in other situations will be the measure of choice due to its presumed inherent low cost, may be ranked lower than replacing the hardware, which normally is the more costly option.

In another example, the same existing system having a data communication connection with limited bandwidth or reliability may require either one software update of a system constituent having a large update file size, i.e., requiring a large amount of data to be transmitted, or require performing three software updates of three different system constituents, the total download size of which is smaller than that of the single update. In this case the option involving updating three system constituents may be ranked higher than the option involving the single update, even if a possible general failure of a certain percentage of updates in a download phase is taken into consideration. Apart from the smaller total amount of data required for updating, the possibility of updating one component at a time may have contributed to the higher ranking in this example, because it allows for interrupting or impeding the system's operation for several shorter time periods rather than one longer time period.

As can be seen from the examples, ancillary considerations relating to a momentary or general capability or feasibility of modifying configurations may also be of importance in the ranking.

The computer-implemented method in accordance with the third aspect further includes outputting a ranked list of systems whose attack and/or threat vulnerability value does not exceed a predetermined threshold, e.g., all systems whose attack and/or threat vulnerability value does not exceed the corresponding value of the system to be configured. Alternatively, a ranked list indicating the differences between the system to be configured and the identified alternative systems is output. In a further alternative an automatic process is initiated, in accordance with which one or more of the constituents of the system to be configured are subjected to modifications which place the modified system at a higher rank in the ranked list than the system prior to the modification. The latter may involve an automatic selection of modifications in accordance with the considerations discussed above, e.g., considerations as to the effort.

In an embodiment of the method according to the third aspect the urgency of the configuration or update may be considered in the scheduling thereof. The urgency may be indicated by an urgency value that is determined based on, inter alia, the attack type or threat class into consideration, as well as the actual likelihood of exposure. Scheduling may be used, e.g., in case a plurality of systems requires configuration or update, but the capacity for simultaneous configurations or updates is limited.

If, for example, an attack requires physical access to one of the systems requiring configuration or update, but physical access to this system is normally prevented by further protective measures, this system may be assigned a lower urgency value and be scheduled for a later update time than other systems that do not have additional protection.

The method in accordance with the third aspect may provide information about security dependencies, rather than functional dependencies, between system constituents and their respective variants, which may not be known or obvious even to the person skilled in the art, due to the distributed development of system constituents, often by entirely separate teams. The information about security dependencies may be useful in determining update plans that increase the security of the updated systems over prior versions.

Fourth Aspect

A method, in accordance with a fourth aspect of the present disclosure, of monitoring a digital system for identifying an attack thereon and for controlling the digital system in response to an identified attack includes receiving one or more classifiers for one or more system properties and/or operating states. System properties may include momentary states or values of communication and sensor signals during any of a plurality of operating states of the system. System properties may also include states or values of communication and sensor signals, or changes thereof, occurring within a predetermined time window. System operating states may include, for example, off, standby, boot, normal operation, etc. Each of the system operating states may have typical ranges for sensor signals and may also have typical communication between various system components and/or parties external to the system, which are different from those of other system operating states. Multiple classifiers for various system operating states may be received at the same time, or individual classifiers for particular system operating states may be received upon entering that particular system operating state in a just-in-time manner.

Classifiers may comprise reference pattern of states or values of coinciding communication and sensor signals of the system, or reference pattern of states or values of system communication and sensor signals of the system, or of changes thereof, occurring within a predetermined time window. Each reference pattern indicates an association of system properties in a respective system operating state with one of two classes, including a normal operation state and an attack state. Reference pattern may be used for identifying different types of attack in any system operating state. Classifiers may also comprise configuration parameters for a machine learning or artificial intelligence entity executed in a monitoring and control entity of the digital system. The configuration parameters configure the machine learning or artificial intelligence entity to identify a present or impending attack and a type of attack. The reference patterns may positively identify coinciding communication and sensor signals of the system that had been observed and/or recorded in connection with an attack, which are expected to similarly coincide in attacks of the same kind across a plurality of digital systems that are sufficiently similar. Similarly, the configuration parameters for the machine learning or artificial intelligence entity may configure the entity to positively identify coinciding signals that indicate an attack. One or more of the signals represented in the reference pattern may be assigned different weights or tolerances, and weights and tolerances may be different for different systems, e.g., for accommodating different noise levels in sensor signals of different systems and the like. Classifiers and configuration parameters may be determined from information provided by the method in accordance with the first aspect. For example, the threat information data may that is input to the method in accordance with the first aspect may be used for generating reference pattern of signals or configuration parameters for the machine learning or artificial intelligence entity.

The method further includes receiving, for each of the classes defined by the one or more classifiers, one or more sets of system control operations. A set of system control operations may include a single control operation, e.g., restart the system, or may include a sequence of control operations, for implementing a more complex response to an attack. If more than one set of system control operations is provided for a class, any one thereof may be selected for execution. Selection for execution may, for example, depend on the states of the communication and sensor signals upon which the classification was made. It is also possible to provide a sequence for executing the multiple sets of system control operations, wherein, after a first set is executed, the classification of the communication and sensor signals is repeated and, if the same classification result persists, i.e., an attack is still considered to be present or impending, the second set is executed, and so on. This may implement a staged response to a present or impending attack.

Exemplary sets of system control operations may comprise, for example, control operations that cause one or more of the system constituents to ignore, block, reject or replace communication and/or sensor data that is attributable to the attack, or comprise control operations that cause attenuation, isolation or disabling of a system constituent that is targeted by the identified attack, or comprise control operations that cause one or more of the system constituents to operate in an enhanced security mode, e.g., require additional authentication and/or authorization prior to providing one or more functions of the system targeted by the identified attack, or comprise control operations that cause storing communication and/or sensor data that is timely related to the identified attack in a secure memory space provided with one or more constituents of the system, or comprise control operations that cause transmitting communication and/or sensor data that is timely related to the identified attack to a storage external to the digital system. At least some of the control operations may advantageously reduce the load on the digital system during normal operation, thereby saving energy, or may advantageously reduce the communication, authorization and/or authentication overhead during normal operation, i.e., when no attack is identified, thereby increasing the system's perceived responsiveness and usability.

A set of system control operations may correspond to a repetition of control operations that had previously been found effective for an attack of a same type, even if reported for a different system. The information about the effectiveness of responses to attack types may be one output of the method of identifying and classifying in accordance with the first aspect, but may also be one output of the method of configuring digital systems in accordance with the third aspect. The information about the effectiveness may be linked to different attack and/or threat vulnerability values determined for different software versions of systems that are identical in terms of hardware, and which may comprise different sets of control operations.

Replacing communication and/or sensor data includes replacing with default data, with data extrapolated form data received or recorded prior to the present or impending attack, or with data derived from other data originating from sources internal or external to the system known or reasonably assumed not to be affected by the present or impending attack.

The method further includes receiving coinciding communication and sensor signals of the system transmitted or sampled during the operation thereof. Coinciding signals may include signals that occur within a predetermined time period or time window as well as sequences of signals or signal changes. The communication and sensor signals may be received substantially in real-time, and may be sampled in suitable sampling intervals.

The method further comprises classifying the received communication and sensor signals in accordance with the received classifiers. Classifying may assign a momentary set of communication and sensor signals to one of two classes, e.g., "attack" and "no attack", but may also assign a momentary set of communication and sensor signals to more classes, e.g., a class for "no attack" and classes for different types of attacks. Classifying may comprise comparing the received communication and sensor signals with the reference pattern for those signals, or operating a machine learning or artificial intelligence entity in accordance with corresponding configuration parameters to identify, in the received coinciding communication and sensor signals of the digital system, a present or impending attack and a type of attack.

The method further includes executing at least one of the received sets of system control operations in the digital system in response to at least one classification result belonging to a class associated with an attack.

If a machine learning or artificial intelligence entity is provided for implementing the monitoring and control unit of the digital system, the effectiveness of sets of system control operations in the respective may be assessed whenever such control operations are triggered, and may be used for improving the configuration of the machine learning or artificial intelligence entity. Corresponding information may also be provided as input to the method according to the first aspect.

Fifth Aspect

In accordance with the fifth aspect of the present disclosure a data processing apparatus implementing a security component or monitoring entity for a digital system is provided, which is configured to receive one or more classifiers for one or more system properties and/or system operating states, and further configured to receive, for each of the classes defined by the one or more classifiers, one or more sets of system control operations. The classifiers may be received at any time of the operation of the digital system, including, e.g., at start-up or boot. The data processing apparatus is further configured to receive coinciding communication and sensor signals of the digital system, or to receive communication and sensor signals occurring within a predetermined time window and possibly in predetermined relationships to each other. Receiving may include one-time reception and storing in a non-volatile memory, or periodic or continuous receiving, e.g., via an interface, and at least temporary storage in a memory or register. Receiving may also be triggered by changing an operating mode, etc.

The data processing apparatus is further configured to classify the received communication and sensor signals in accordance with the received classifiers, and configured to execute at least one of the received sets of system control operations in the digital system in response to at least one classification result belonging to a class associated with an attack. The data processing apparatus may comprise, in addition to one or more microprocessors and associated memory, one or more communication and sensor interfaces, for receiving classifiers, communication and sensor signals, and for transmitting commands for executing system control operations.

The security component or monitoring entity may implement a machine learning system or an artificial intelligence adapted to identify attacks or threats from the monitored communication and sensor signals, and trigger protective, preventive, or forensic actions if, after analyzing a current system and environment status, an attack or threat can be assumed with a probability that exceeds predetermined a threshold. The machine learning system or artificial intelligence may be adapted to adjust classifiers over time based on observed communication and sensor signals, e.g., for accommodating different use patterns of the system it is associated with, or ageing of system components. Such adjustment may also consider legit user input in response to a suspected attack that confirms a false alarm.

The security component or monitoring entity may be implemented as computer program instructions that are executed in one or more ECUs or system components. The ECUs or system components implementing the security component or monitoring entity may already be part of the system, and the corresponding security function may be implemented by updating the software executed by the existing ECUs or system components. In this case it may be preferred that the software-implemented security component is executed in a software process or thread that is separated from other processes. For example, executing the software-implemented security component or monitoring entity on a separate processor core of a multi-core processor or on a separate processor of a multi-processor system may be envisaged. However, it may also be envisaged to add an additional hardware component to the digital system. The security component or monitoring entity may provide individual security functions to the ECU or system component it is implemented in, or may provide security functions through the cooperation of several ECUs and system components.

Preventive actions may, e.g., include raising authentication and/or authorization requirements while not limiting functions and availability thereof in the system. In a motor vehicle which normally can be operated when the remote control is close to or inside the vehicle, this could include, for example, one or more of requesting the user to enter an additional passcode, or to check if a smartphone that is known to belong to the user is within range for coupling to the vehicle systems, and the like.

Protective actions may include stopping or restarting one or more system services or system constituents, or causing a system component's network interface to mute, e.g., in case a denial of service attack is identified, if that component is still responding to commands. If such component is not responding to commands any more, the preventive action may lie in isolating the system on the network, by accordingly controlling network switches or routers to block traffic coming from the component that shows abnormal behavior. Protective actions may thus generally include maintaining general system operation, but possibly at reduced functionality or availability of services.

Forensic actions may include storing a large amount of data from all kinds of sensors, communication from all kinds of communication interfaces, etc., in a secure memory area, for documenting the system's status at the time of the attack or event and for securing evidence, in case an attack or threat cannot be avoided or thwarted. In a vehicle the data stored may include information about which music was playing at the time of the attack or event, which doors were opened or closed before or after the attack or event, which mobile devices were coupled to the vehicle's systems, etc. This may be similar to a memory dump of a general computer system in case the computer has crashed, and may allow for analysis of the circumstances of the attack and the key vulnerability that had been exploited. The information stored in a forensic action may also help providing evidence that a damage was actually caused by an attack and not in an attempted insurance fraud.

Triggering forensic actions in a situation-aware manner, i.e., depending on an analysis of sensor and signal data indicating a present or impending attack, may reduce the amount of data required and the system load required for this purpose, e.g., because data is not continuously stored, but only conditionally stored.

Data stored in a secure memory area may be accessed for reading, erasing or overwriting only under enhanced security conditions, e.g., requiring special authentication and authorization, availability of which may be limited to the system's manufacturer, an insurance or the like.

In case an attack or a threat was erroneously assumed by the security component the secure memory location may be erased, e.g., by authorized service personnel or by the security component. In the latter case, a specific signal may be required, that may be sent by an authorised person or system, or that may be generated by the security component if a sufficiently long period of "normal" operation follows a presumed attack or threat.

Taking protective, preventive or forensic actions requires that the monitoring entity is equipped with proper configuration parameters. Even an artificial intelligence or machine learning instance may not be able to identify an attack or a threat is has never before "seen" with sufficient accuracy and probability, even less so if it has no proper "idea" about the system it is monitoring. Thus, receiving an initial configuration and updating the configuration of the monitoring entity may be advantageous, whenever new attacks or threats have been documented for identical or similar digital systems.

The monitoring entity of the digital system is, therefore, adapted to receive configuration parameters for configuring the security component or monitoring entity to monitor properties or statuses of the digital system, and to classify the monitored properties or statuses into one of at least two classes. The configuration parameters may be generated by a method in accordance with the third aspect. The at least two classes may comprise a class for normal operation and a class for abnormal operation, e.g., as found when the system is under attack or exposed to a threat. The security component or monitoring entity may also be configured to control the digital system it is associated to, or parts thereof. The received configuration parameters may comprise one or more classifiers for performing the classification. Monitoring statuses or properties of the digital system may include monitoring sensor data captured by a system component or data communication between system components or with external communication parties.

As mentioned before, the security component or monitoring entity, including implementations of machine learning systems or artificial intelligences, may be implemented in a single hardware device or across multiple hardware devices, preferably those that are connected by a network.

The methods and apparatuses disclosed herein may be used advantageously in situations where more or less standardized components are combined into a large variety of digital systems in accordance with the desires and requirements of individual users, a phenomenon that is also referred to as mass customization. The often confusing, unmanageable plurality of similar yet different systems may bring about a corresponding or even larger plurality of vulnerabilities to attacks or threats, simply because it has become impossible to know all ways and manners system constituents can interact and interfere, and possibly open new, formerly unknown vulnerabilities.

Creating and maintaining a database as disclosed herein under the first aspect may allow for identifying more or less vulnerable systems and constituents, and may facilitate simulating, or at least providing a probability for systems' and their constituents' vulnerability to attacks and threats.

The information provided in the database may be used for selecting system components for a new system to be built, but also for distributing software updates to one or more system constituents. In the latter case it may be possible to identify an increased vulnerability of the system when one of its constituents is updated, which may be reduced again by configuring the software in other system constituents. It may even be possible to determine whether downgrading a software version, as opposed to the mainstream solution of upgrading, in other system constituents results in a lower vulnerability. The vulnerability value assigned to a system may thus be used to identify a need for updating the software of other constituents in the course of a scheduled update of one system constituent. As discussed further above, the information provided in the database may also be useful in identifying a combination of system constituents to be updated that results in the smallest total amount of data to be transmitted for the update. This may be beneficial in case of an over the air update, since it reduces the network traffic required for updating a plurality of similar or identical systems and may help speeding up the deployment of the update.

The system vulnerability values may also be used for classifying systems, e.g., for determining insurance primes for systems in accordance with their respective vulnerability value. The primes may provide an incentive for system designers and suppliers to design their systems to have a low vulnerability for reducing the total cost of ownership for their systems and/or for users to update their system components if this results in a lower vulnerability.

The methods and apparatuses described in the present document may allow for defending against attacks, reducing threats or securing evidence after an attack has occurred. The methods and apparatuses presented in this document may also provide fact-based input to insurance companies and other entities that, while not developing or operating such digital systems, have a technical or business interest connected therewith.

The methods and apparatuses disclosed herein may be advantageously used in user- or client-configurable mobile systems, in distributed digital systems that are communicatively connected, and in particular in automobiles and similar systems, or in digital systems in the aerospace and finance industries, or in Internet-of-Things environments.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

In the figures, same or similar elements may be referenced by the same reference designator.

Figure 1:
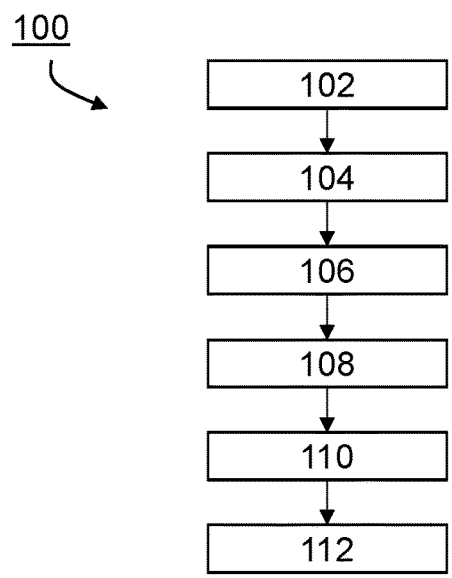
FIG. 1 shows an exemplary and simplified flow diagram of a method of identifying and classifying a plurality of digital systems' and/or their components' vulnerabilities to one or more of a plurality of threats classes and/or attack types in accordance with the first aspect.

FIG. 1 shows an exemplary and simplified flow diagram of a method 100 of identifying and classifying a plurality of digital systems' and/or their components' vulnerabilities to one or more of a plurality of threats classes and/or attack types in accordance with the first aspect. In step 102 of the method system information data configurations of a plurality of digital systems is received. As mentioned further above, the data received may represent systems that may or may not already have been subject to attacks. In step 104 attack and/or threat information data associated with attacks on and/or threats posed to individual ones of the plurality of digital systems is received, and analyzed in step 106, for identifying one or more attack types and/or threat classes associated with individual ones of the digital systems. At this stage the association of attack types and threat classes with individual ones of the digital systems does not yet try to find out those individual system constituents or combinations that may play a larger role in the attack than others. In step 108 correlations and/or causalities between individual system constituents or combinations thereof in the digital systems associated with attacks and/or threats are identified for each of the identified attack types and/or treat classes. Identifying correlations may comprise identifying system constituents that were present in all or most attacks of one type, or are subject to a specific type of threat. For example, system constituents that store private data may be more likely to be subject to a threat of the class "information disclosure", and this class may thus comprise a number of this kind of system constituents. System constituents that implement access control may be more likely to an attack of the class "brute force attack", and this class may thus comprise a number of this kind of system constituents. System constituents that store private data and implement access control may be found in both classes. In step 110 an attack and/or threat vulnerability value is assigned to each of the systems and/or systems' constituents and/or combinations thereof, based on the identified correlations and/or causalities and for each attack or threat. The resulting threat and/or attack vulnerability values are stored in a database for later retrieval in step 112. It is obvious that each system, system constituent or combination thereof may be assigned multiple threat and/or attack vulnerability values, depending on the threat classes and attack types they had been associated with in step 108.

Figure 2:
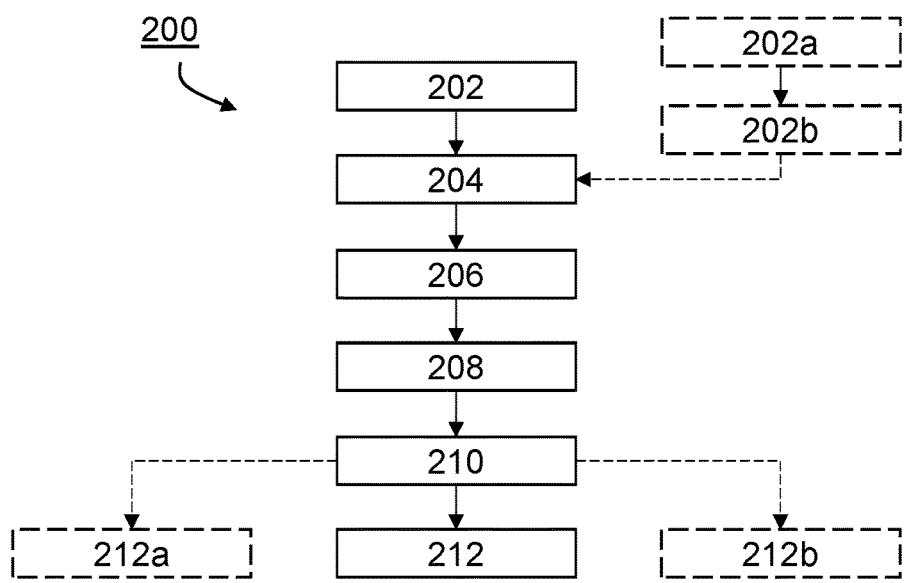
FIG. 2 shows an exemplary and simplified flow diagram of a method of configuring digital systems, targeted to provide immunity or a reduced vulnerability of the digital systems against one or more attacks and/or threats, in accordance with the third aspect.

FIG. 2 shows an exemplary and simplified flow diagram of a method 200 of configuring digital systems, targeted to provide immunity or a reduced vulnerability of the digital system against one or more attacks and/or threats, in accordance with the third aspect. In step 202 system information data representing a configuration of a digital system to be configured is received. Alternatively, in step 202a information allowing for identifying, in a database, a digital system to be configured is received, and information representing the configuration of the digital system to be configured is received in step 202b. In step 204 the database is searched for one or more systems having a sufficiently similar configuration. In step 206 the vulnerabilities of the system to be configured and of the systems having sufficiently similar configuration are identified and classified, and in step 208 corresponding threat and/or attack vulnerability values are assigned, e.g., in accordance with the method discussed with reference to FIG. 1. In step 210 the system to be configured and the systems having sufficiently similar configuration are ranked in accordance with one or more ranking criteria. The ranking criteria may comprise the respective threat vulnerability values and other ranking criteria as discussed further above. A ranked list of systems whose attack and/or threat vulnerability value does not exceed a predetermined threshold is output in step 212. Alternatively, a ranked list indicating the differences between the system to be configured and the systems having sufficiently similar configuration is output in step 212a. In a further alternative an automatic process is initiated in step 212b in accordance with which one or more of the constituents of the system to be configured are subjected to modifications which place the modified system at a higher rank in the ranked list than the system prior to the modification.

Figure 3:
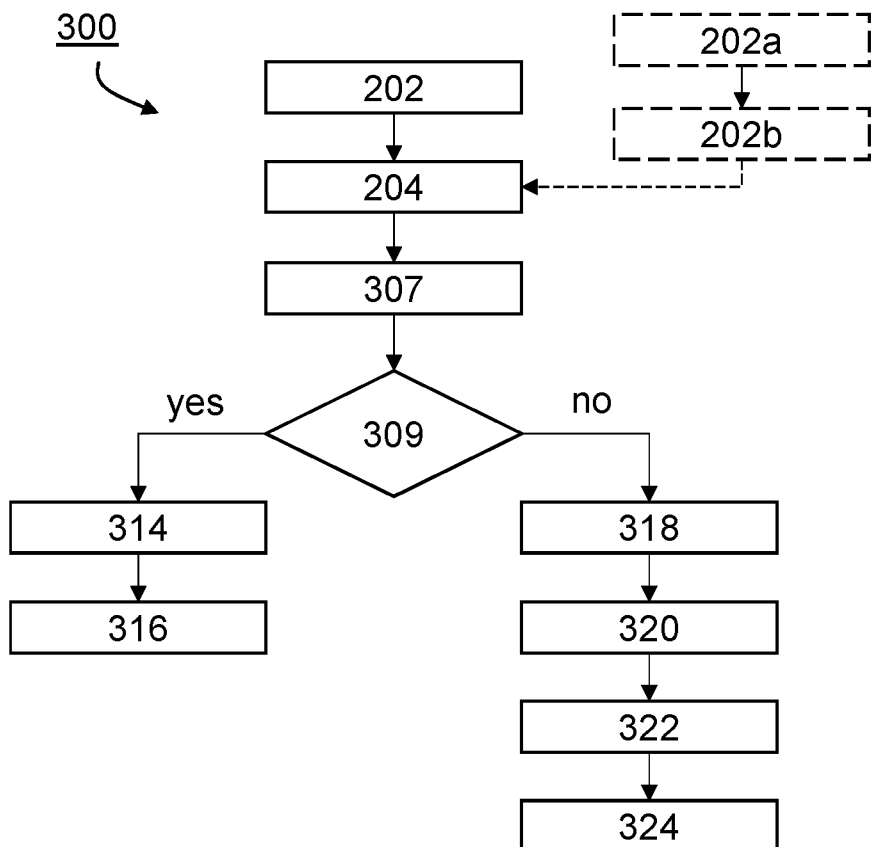
FIG. 3 shows an exemplary and simplified flow diagram of a variant of the method discussed with reference to FIG. 2.

FIG. 3 shows an exemplary and simplified flow diagram of a variant 300 of the method 200 discussed with reference to FIG. 2. Steps 202 to 204 of the variant 300 are the same as shown in FIG. 2 and will not be addressed again. In step 307 one or more systems having an identical configuration in terms of hardware are found and returned from the database. In step 309 the database searches those systems returned in step 307 for one or more systems having a pointer to more "evolved" versions of that prior system, i.e., versions that had already been configured to reduce vulnerability or provide immunity against a threat or attack, as indicated by the assigned attack and/or threat value. In this case, if such "evolved" version having an attack and/or threat value that is lower than that of the system to be configured is found, "yes"-branch of step 309, the differences between the system to be configured and the "evolved" system from the database are determined in step 314 and provided, in step 316, as a basis for configuring the system to be configured. If the difference between the pre-configuration system and an evolved version thereof mainly lies in configuration parameters of a machine learning system or an artificial intelligence instance that is provided as a security component in the system, the resulting configuration may simply comprise updating the configuration parameters. The "evolved" parameter set may configure the security component to improve identification of attack or threat situations and to initiate more evolved corresponding responses.

If more than one "evolved" versions are identified these may be provided in a ranked fashion in accordance with their respective vulnerability value, similar as in step 210 of the method as described with reference to FIG. 2. In this context it is assumed for simplicity that a smaller vulnerability value is better than a higher value. Generally, any configuration of a system is advantageously recorded and stored in the database for later reference in such a way that it is possible to follow "paths of evolution" of systems.

In case no "evolved" system having a same "pre-evolution" configuration is found in the database, "no"-branch of step 309, the method identifies in step 318, amongst the sufficiently similar systems from the database, those having the smallest overall attack and/or threat value or having the smallest combined threat value for those system constituents that are also present in the system to be configured. The overall attack and/or threat value may include a weighting factor for individual system constituents to compensate for smaller differences in the systems. Again, only those systems having an attack and/or threat value that is lower than that of the system to be configured are output for further consideration in step 318. In step 320 the method determines sets of differences between the sufficiently similar systems having the smallest attack and/or threat values and the system to be configured. These sets of differences may already provide some information about which system constituent needs to be configured for achieving the desired immunity or reduced vulnerability against attacks and/or threats.

In step 322 the method ranks the sets of differences of the various systems by their overall impact on the targeted immunity or reduced vulnerability or provision of other responses and the required effort for eliminating the differences. Again, the overall impact on the targeted immunity or reduced vulnerability may be weighted, e.g., for taking minor differences between the various systems into account. Based on the ranked sets of differences a list of measures may be determined and output for further action in step 324.

Figure 4:
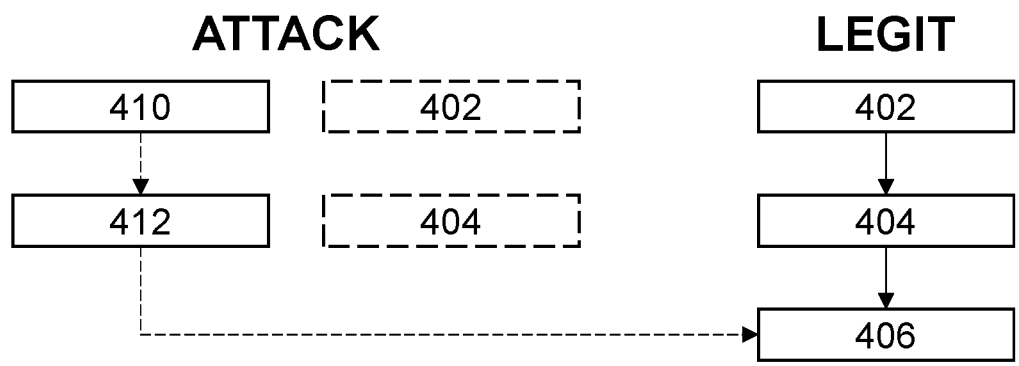
FIG. 4 shows exemplary and simplified sequences of events and sensor or communication data that can be observed in case of an attack as opposed to a legit system operation in a vehicle.

FIG. 4 shows exemplary and simplified sequences of events and sensor or communication data that can be observed in case of an attack as opposed to a "legit," i.e., legitimate system operation in a vehicle. The attack in this example is related to deploying airbags of a vehicle in a non-crash situation, which may primarily be used for causing financial damage to a vehicle owner or blackmailing a vehicle manufacturer.

On the right side of FIG. 4 a legit flow of events and sensor or communication data is shown. First, one or more sensors detect signals that indicate a collision of the vehicle that requires deploying airbags. The sensors may be configured to detect impact forces on the bumper or doors, or acceleration or deceleration. If such force, acceleration or deceleration is detected the sensors will send corresponding signals via a protected communication channel to a control unit that is configured to deploy the airbags under certain conditions, box 402. The conditions may, for example, include positively verifying the strength of impact force by comparing sensor data from multiple sensors, verifying if the sensor values can logically occur in an operating mode immediately preceding the alleged crash, verifying if a seat is occupied at the time of the impact, and the like. Once the control unit has positively verified the sensor signals, it will send a trigger signal to the airbag units, box 404, which will correctly fire and deploy, box 406. The communication between the sensors, the control unit and the airbag units may comprise transmitting corresponding authentication codes and likewise may comprise registering the individual components upon start-up of the system. In connection with triggering the airbags the various sensor and communication signals may be recorded in a secure memory space for later analysis.

On the left side of the figure an exemplary signal flow of an attack is shown. First, an attacker gains access to the signal connection between the control unit and the airbag unit, and tries to override the authentication for accessing the airbag unit, step 410. The attacker may use a brute-force attack or a rainbow table, and the airbag unit may only implement weak protection, e.g., due to the need to deploy quickly once a trigger signal is received, which may rule out complex and time-consuming authentication procedures. Once the attacker has gained access to the airbag unit, the attacker issued a trigger command for deploying the airbags, box 412. The airbags will fire and deploy, box 406, upon receiving the command. However, no sensor and communication signals are detected and sent to the control unit, as indicated by the dashed line of box 402. Likewise, the control unit does not verify and issue the trigger signal, as indicated by dashed box 404. Consequently, no sensor and communication signals are recorded in a secure memory space for later analysis. In this example the control unit implements a security function that cannot prevent an attack, but that can still provide evidence of an attack after the fact. In the case of an attack the evidence is the absence of data related to the deployment of airbags in a secure memory area.

Figure 5:
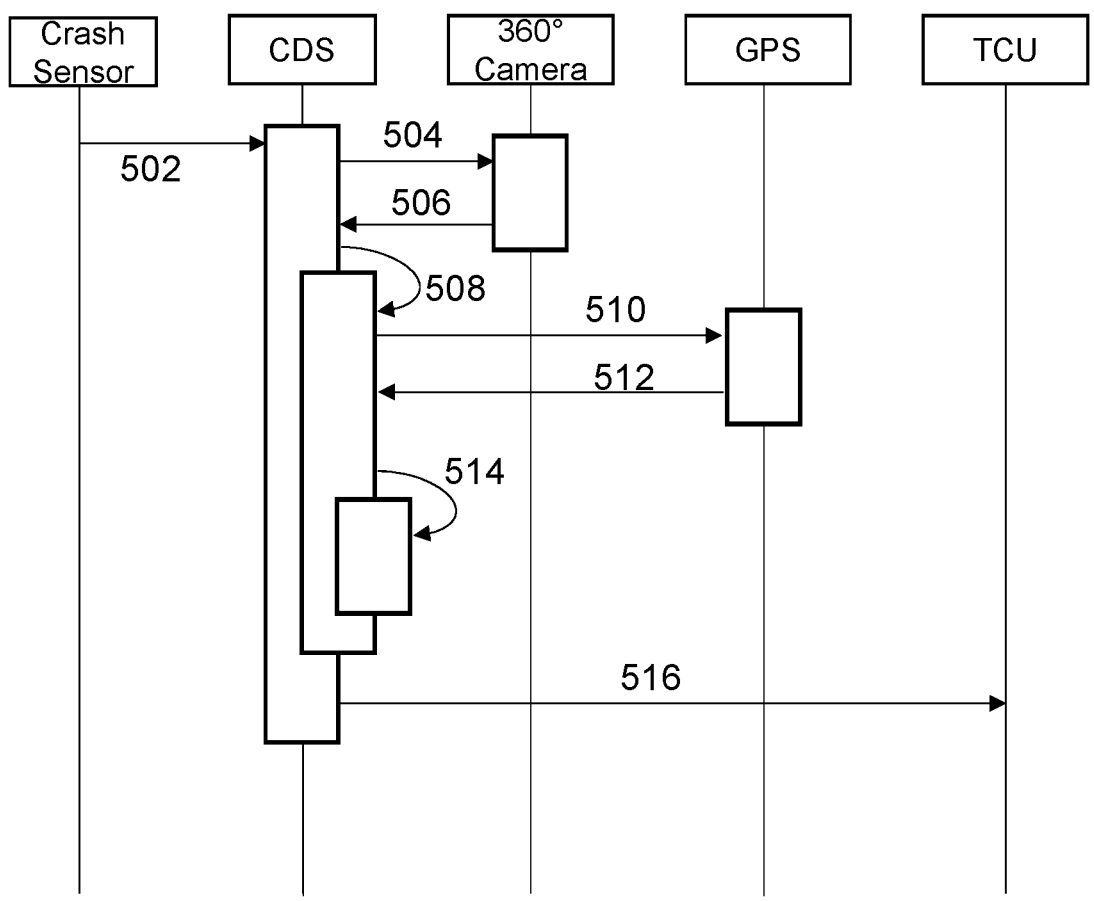
FIG. 5 shows exemplary and simplified sequences of events and sensor or communication data in connection with a normal operation of a system following an event, for securing evidence.

FIG. 5 shows exemplary and simplified sequences of events and sensor or communication data in a vehicle in connection with a normal operation of a system following an event, for securing evidence. The exemplary vehicle is equipped with one or more cameras, e.g., for lane assist and parking support systems, and may also have a navigation system (GPS) with a receiver for determining the position of the vehicle as well as a telematics control unit (TCU) adapted for tracking a position of a vehicle and for communicating with a remote server. Beginning from left and from the top, at first a crash sensor sends a signal indicating that a crash has occurred to a crash detection system CDS, arrow 502. The CDS triggers the one or more cameras to capture images of the crash site, and receives the images, arrows 504 and 506. The CDS tags and signs the captured images, arrow 508. The CDS further requests and receives location data from the navigation system, for pinpointing the location of the crash, arrows 510 and 512, and tags and signs the requested and received location data, arrow 514. The collected incident information is sent to telematics control unit TCU for storing and/or transmitting to a remote server, arrow 516. The CDS may be considered a safety control unit in this exemplary setting. It may operate in accordance with sensor and communication pattern data or an accordingly configured machine learning system or artificial intelligence for preventing attacks as the one discussed with reference to FIG. 4. The CDS may, thus, also secure evidence in case the analysis of sensor or communication signals indicates that an attack is present or impending. Configuration parameters for the machine learning system or artificial intelligence may be generated based on the method discussed with reference to FIG. 1.

Figure 6:
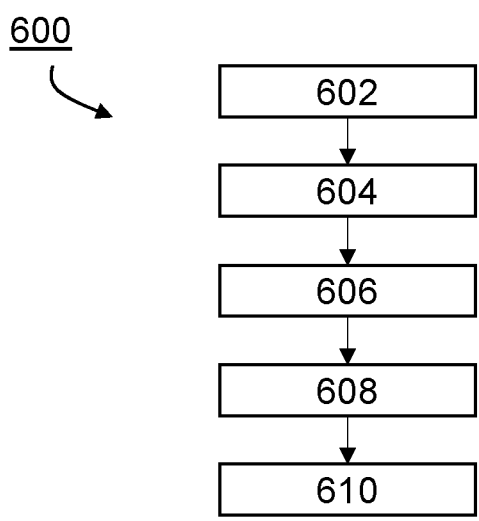
FIG. 6 shows an exemplary and simplified flow diagram of a method of monitoring a digital system for identifying an attack thereon and for controlling the digital system in response to an identified attack in accordance with the fourth aspect.

FIG. 6 shows an exemplary and simplified flow diagram of a method 600 of monitoring a digital system for identifying an attack thereon and for controlling the digital system in response to an identified attack in accordance with the fourth aspect. In step 302 the method receives one or more classifiers for one or more system properties and/or system operating states determined in accordance with information received in and/or provided by the method herein. In step 604 the method receives, for each of the classes defined by the one or more classifiers, one or more sets of system control operations. In step 606 the method receives coinciding communication and sensor signals of the digital system transmitted or sampled during the operation thereof. In step 608 the method classifies the received communication and sensor signals in accordance with the received classifiers, and in step 610 the method executes at least one of the received sets of system control operations in the digital system in response to at least one classification result belonging to a class associated with an attack.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A computer-implemented method (100) of identifying and classifying a plurality of digital systems' and/or their components' vulnerabilities to one or more of a plurality of attack types, the method comprising:
   receiving (102) system information data representing configurations of a plurality of digital systems;
   receiving (104) attack information data associated with attacks on individual ones of the plurality of digital systems;
   analyzing (106) the system information data and the associated attack information data, for identifying one or more attack types associated with individual ones of the digital systems;
   identifying (108), for each of the identified attack types, correlations and/or causalities between individual system constituents or combinations thereof in the digital systems associated with attacks;
   determining and assigning (110), based on the identified correlations and/or causalities, an attack vulnerability value, for each attack, respectively, to each of the systems and/or systems' constituents and/or combinations thereof; and
   retrievably storing (112) attack vulnerability values associated with the systems, system constituents and/or combinations thereof.

2. The method (100) of claim 1, wherein receiving attack information data comprises receiving data pertaining to communication and sensor readings of the system at the time of the attack or in a time window including the time of the attack.

3. The method of claim 2, wherein receiving attack information data comprises receiving contextual information pertaining to the attack from secondary data sources based upon information included in the received attack information data.

4. A computer-implemented method (200) of configuring digital systems, targeted to provide immunity or a reduced vulnerability of the digital systems against one or more attacks, comprising:
   receiving (202) system information data representing a configuration of a digital system to be configured, or receiving (202a) information allowing for identifying, in a database, a digital system to be configured, for receiving (202b) information representing the configuration from that database;
   identifying (204) one or more systems having the same or a sufficiently similar configuration in a database;
   identifying and classifying (206) the vulnerabilities of the system to be configured and of the system having sufficiently similar configuration in accordance with the method of claim 3, and assigning (208) corresponding attack vulnerability values;
   ranking (210) the system to be configured and the systems having sufficiently similar configuration in accordance with one or more ranking criteria; and
   outputting (212) a ranked list of systems whose attack vulnerability value does not exceed a predetermined threshold, or outputting (212a) a ranked list indicating the differences between the system to be configured and the systems having sufficiently similar configuration, or initiating (212b) an automatic process in accordance with which one or more of the constituents of the system to be configured are subjected to modifications which place the modified system at a higher rank in the ranked list than the system prior to the modification.

5. The method (200) of claim 4, wherein subjecting a plurality of systems to be configured to respective modifications includes scheduling initiation of the modifications in accordance with an urgency value assigned to each system.

6. A computer-implemented method (600) of monitoring a digital system for identifying an attack thereon, and for controlling the digital system in response to an identified attack, comprising:
   receiving (602) one or more classifiers for one or more system properties and/or system operating states determined in accordance with information received in and/or provided by the method of claim 3;
   receiving (604), for each of the classes defined by the one or more classifiers, one or more sets of system control operations;
   receiving (606) coinciding communication and sensor signals of the digital system transmitted or sampled during the operation thereof;
   classifying (608) the received communication and sensor signals in accordance with the received classifiers; and
   executing (610) at least one of the received sets of system control operations in the digital system in response to at least one classification result belonging to a class associated with an attack.

7. The method (600) of claim 6, wherein classifiers include:
   a plurality of reference patterns of states or values of coinciding communication and sensor signals of the system, or
   a plurality of reference patterns of states or values of system communication and sensor signals of the system, or of changes thereof, occurring within a predetermined time window,
   wherein each reference pattern indicates an association of system properties in a respective system operating state with one of two classes,
   or wherein the classifiers include:
   configuration parameters for a machine learning or artificial intelligence entity executed in a monitoring and control unit of the digital system, the configuration parameters configuring the machine learning or artificial intelligence entity to identify a present or impending attack and a type of attack, and wherein classifying (608) comprises:
comparing the reference pattern and the received coinciding communication and sensor signals of the digital system, for identifying a present or impending attack, or
operating the machine learning or artificial intelligence entity to identify, in the received coinciding communication and sensor signals of the digital system, a present or impending attack and a type of attack.

8. The method (600) of claim 7, wherein the sets of system control operations comprise control operations that cause one or more of the system constituents to:
ignore, block, reject or replace communication and/or sensor data that is attributable to the identified attack,
attenuate, isolate or disable a system constituent that is targeted by the identified attack,
require additional authentication and/or authorisation prior to providing one or more functions of the system targeted by the identified attack,
store communication and/or sensor data in a secure memory space provided within one or more constituents of the digital system, or
transmit communication and/or sensor data to a storage external to the digital system.

9. The method (600) of claim 8, wherein replacing communication and/or sensor data includes replacing with default data, with data extrapolated from data received or recorded prior to the present or impending attack, or with data derived from other data originating from sources internal or external to the system known or assumed not to be affected by the present or impending attack.

10. A data processing apparatus comprising data and/or sensor interfaces, further comprising a processor configured to perform the method of claim 1.

11. A computer-readable medium comprising instructions which, when executed by a computer, cause the computer to carry out the method of claim 1.

* * * * *